Sept. 11, 1956 W. E. DALBY 2,762,629
SPLINE ARBORS OR CHUCKS
Filed May 4, 1954 3 Sheets-Sheet 1
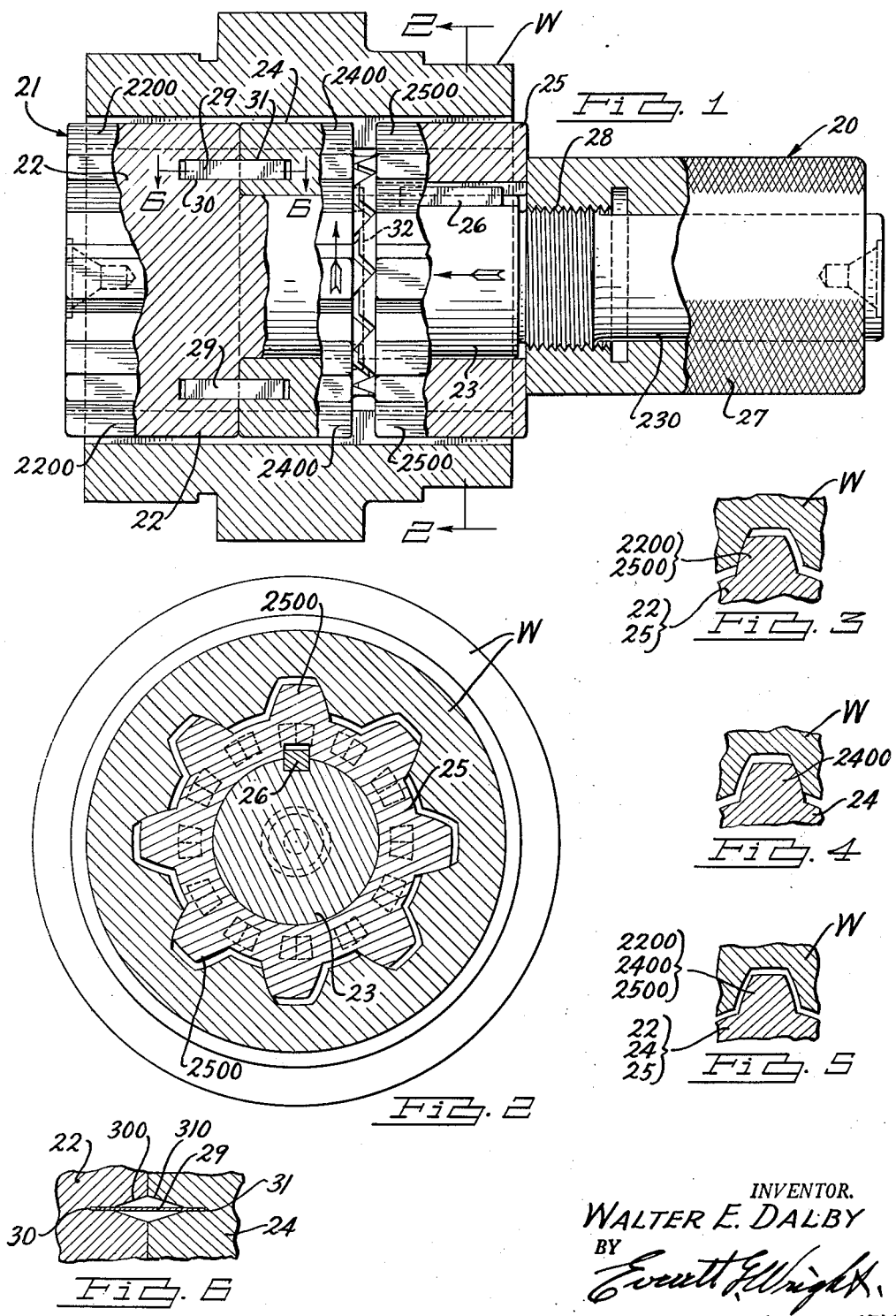
INVENTOR.
WALTER E. DALBY
BY
ATTORNEY

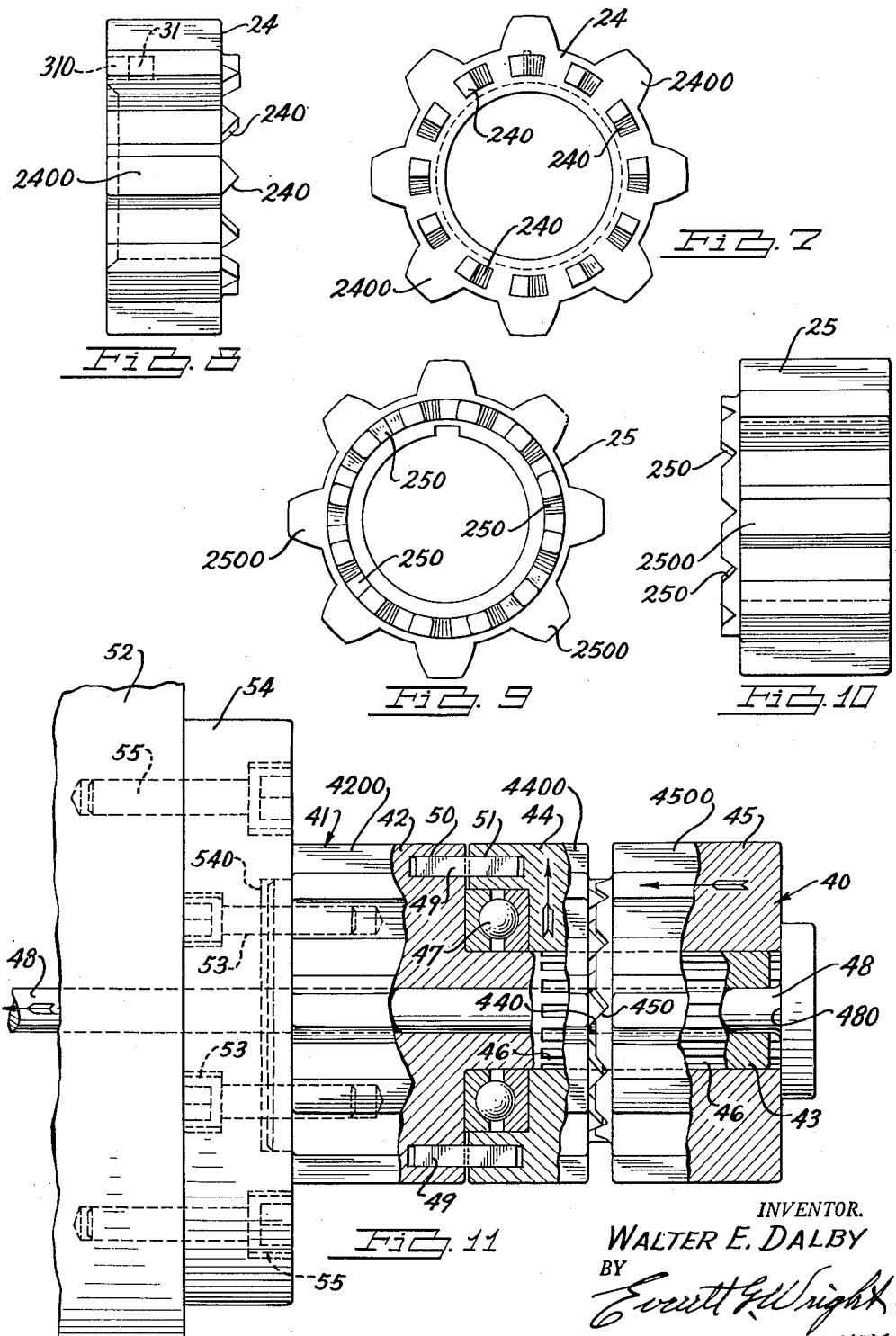

Sept. 11, 1956 W. E. DALBY 2,762,629
SPLINE ARBORS OR CHUCKS
Filed May 4, 1954 3 Sheets-Sheet 3
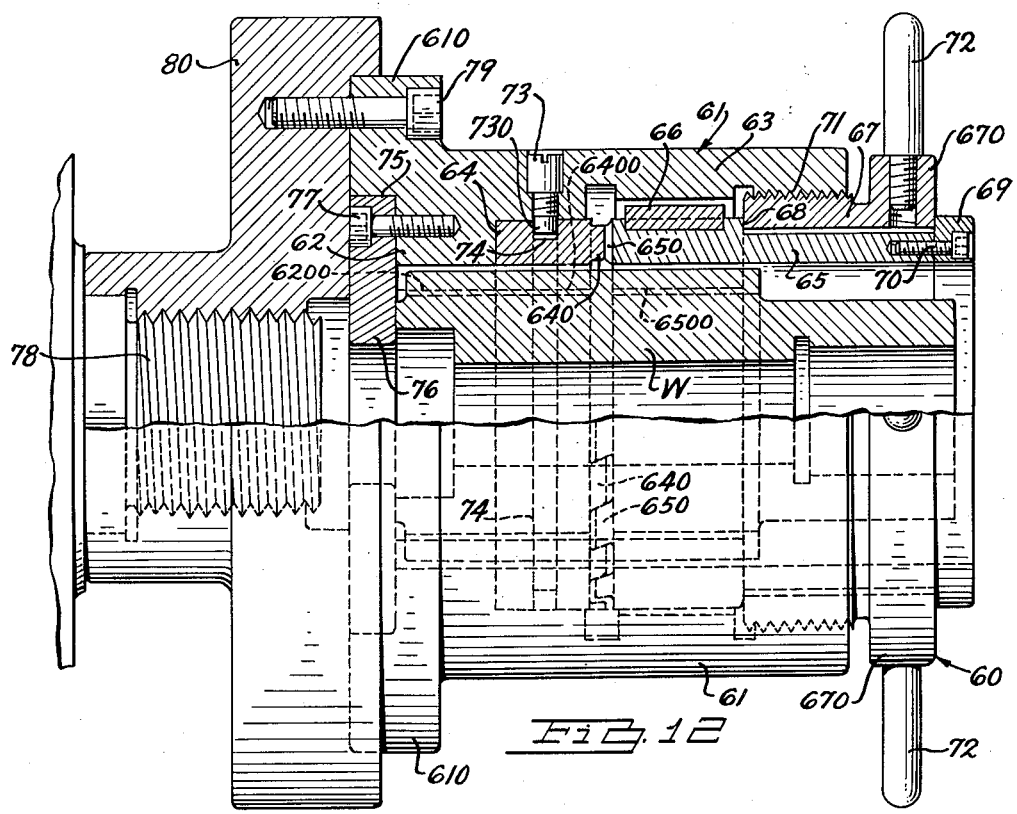
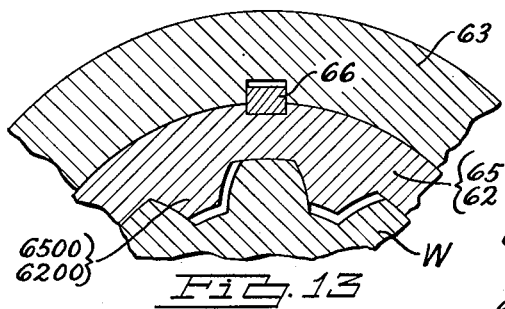
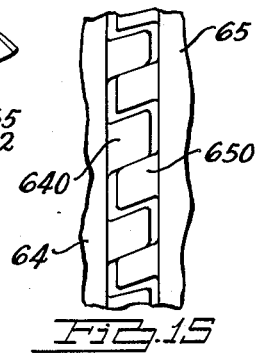
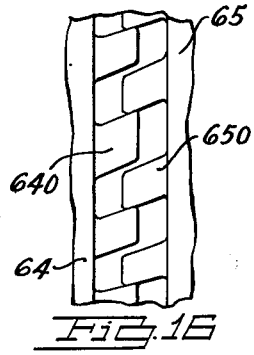
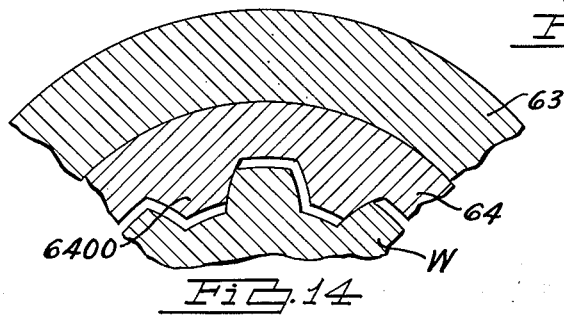
INVENTOR.
WALTER E. DALBY
BY
ATTORNEY United States Patent Office 2,762,629
Patented Sept. 11, 1956

2,762,629

SPLINE ARBORS OR CHUCKS

Walter E. Dalby, Detroit, Mich.

Application May 4, 1954, Serial No. 427,559

12 Claims. (Cl. 279—1)

This invention relates to spline arbors or chucks and in particular to improved means to accomplish accurate self-centering and positive locking of work thereon.

The primary object of the invention is to provide spline arbors or chucks which have a positive and uniformly smooth action that assures perfect centering of a splined work piece and the positive locking of the work in its centered relationship on complementarily splined work engaging elements of the arbor or chuck.

Another object of the invention is to provide a spline arbor or chuck in which splined work engaging elements are automatically aligned and maintained in alignment when the arbor or chuck is unlocked to receive or release work thereon.

Another object of the invention is to provide a spline arbor or chuck which is readily adaptable to fast loading and unloading and to power operation.

A further object of the invention is to provide in a spline arbor or chuck embodying the invention incorporating smooth and uniformly operating mechanical means to positively axially center and lock work pieces thereon, which arbor or chuck may be locked and unlocked in a minimum of time and with a minimum effort and is always in a free work receiving and work releasing position when unlocked.

Other objects of the invention will become apparent by reference to the following detailed description taken in connection with the accompanying drawings, in which:

Fig. 1 is a longitudinal sectional view of a spline arbor embodying the invention adapted to center and lock internally splined work pieces thereon.

Fig. 2 is a cross sectional view taken on the line 2—2 of Fig. 1.

Figs. 3 and 4 are fragmentary sectional views showing the relationship of splines of the arbor to splines of the work piece when the work piece is centered and locked onto the arbor.

Fig. 5 shows the relationship of splines of the arbor to splines of the work piece when the arbor is unlocked to permit the work piece to be telescoped freely onto or removed from the arbor.

Fig. 6 is a fragmentary sectional view taken on the line 6—6 of Fig. 1 showing the self-aligning spring means employed to resiliently maintain the arbor spline elements in alignment when the arbor is in its unlocked position.

Figs. 7 and 8 are end and side elevational views respectively of the arbor lock element showing the annularly spaced end facing cams thereof.

Figs. 9 and 10 are end and side elevationial views respectively of the arbor slide element showing the annularly spaced end facing cams thereof which engage the cams of the arbor lock element and turn said arbor lock element to center and lock work on the arbor.

Fig. 11 is a longitudinal sectional view of a spline chuck similar in construction to the spline arbor disclosed in Figs. 1–10 inclusive, the said chuck being adapted to power operation.

Fig. 12 is a longitudinal sectional view of a modified form of a spline chuck embodying the invention adapted to center and lock externally splined work pieces therein.

Figs. 13 and 14 are fragmentary sectional views showing the relationship of splines of the chuck to splines of the work piece when the work piece is centered and locked into the chuck.

Fig. 15 is a fragmentary elevational view of the annularly spaced end facing cams on the chuck lock and slide elements in their locked position.

Fig. 16 is a fragmentary elevational view of the annularly spaced end facing cams on the chuck lock and slide elements in their unlocked position.

Referring now to the drawings wherein like numerals refer to like and corresponding parts throughout the several views, the particular embodiment of the invention disclosed for illustrative purposes in Figs. 1–10 inclusive comprises an arbor generally designated by the numeral 20 composed of three major elements, namely, a body 21 including an externally splined head 22 and an axially aligned shank 23 onto which is rotatably mounted a lock element 24 and slidably mounted a slide element 25. Both the lock element 24 and the slide element 25 are externally splined precisely the same as the head element 22. A suitable key 26 positioned in complementary keyways cut in the shank 23 and in the slide element 25 slidably mounts the slide element 25 on the shank 23 of the body 21 with the splines 2500 of said slide element 25 precisely aligned with the splines 2200 of the splined head element 22.

The lock element 24 and the slide element 25 are each provided with annularly spaced complementary cams 240 and 250 respectively by means of which axial movement of the slide element 25 turns the lock element 24 to lock internally splined work W on the arbor as hereinafter described. A suitable spring retainer ring 32 may be employed to prevent unnecessary longitudinal movement of the lock element 24 in respect to the shank 23 of the body 21. A cam-lock actuator 27 is telescoped onto the free end 230 of the shank 23 and is threaded onto the free end 230 of the shank 23 at 28. The cam-lock actuator 27 provides suitable means for moving the slide element 25 in the direction indicated by the arrow thereon in Fig. 1 to cause the cams 250 of the slide element 25 to engage the cams 240 of the lock element 24 and turn the lock element 24 in the direction indicated by the arrow thereon.

When the cam-lock actuator 27 is in its released position attained by turning it counterclockwise as viewed from the outer end thereof, the splines 2400 of the lock element 24 are resiliently maintained in alignment with splines 2200 of the head 22 of the body 21 and with the splines 2500 of the slide element 25 by means of a plurality of leaf springs 29 positioned in oppositely disposed circumferentially spaced slots 30 and 31 in the adjacent end faces of the head 22 of the body 21 and lock element 24 respectively. The slots 30 and 31 together are preferably slightly deeper than the length of the leaf springs 29, and the slots 30 and 31 are oppositely V-tapered at 300 and 310 respectively to permit limited floating movement of the leaf springs 29 therein and to permit the leaf springs to flex when work W is locked onto the arbor 20. The leaf springs 29 function to move the splines 2400 of the lock element 24 into alignment with the splines 2200 of the head element 22 and the splines 2500 of the slide element 25 when the cam-lock actuator 27 is turned to its released position.

By reference to Fig. 1 and Figs. 7–10 inclusive it will be observed that the complementary cams 240 and 250 of the lock element 24 and the slide element 25 respectively are uniformly spaced around the adjacent annular ends of the lock element 24 and slide element 25 to assure a positive and uniform turning of the lock element 24 by axial movement of the slide element 25 responsive to clockwise turning of the cam-lock actuator 27 as viewed from the outer end thereof.

The externally splined arbor elements 22, 24 and 25 are maintained in alignment by the leaf spring 29 to receive readily and smoothly complementarily internally splined work W thereon, see Fig. 5. When the work W is centered and locked on the arbor by turning the cam-lock actuator 27 the slide element 25 moves axially toward the lock element 24 whereupon the cams 250 of the slide element 25 engage the cams 240 of the lock element 24 and turns the lock element 24. This turning of the lock element 24 brings the splines 2400 thereof and axially spaced splines 2200 and 2500 of the head element 22 and the slide element 25 into engagement with the complementary splines of the work W, first centering the work W on the arbor and then locking it in its centered position thereon, see Figs. 3 and 4.

In Fig. 11 is disclosed a chuck 40 embodying the invention which is adapted to power operation. The chuck 40 is composed of a body 41 including an externally splined head 42 and an axially aligned shank 43 onto which is rotatably mounted a lock element 44 and slidably mounted a slide element 45. Both the lock element 44 and the slide element 45 are externally splined precisely the same as the head element 42. The slide element 45 and the shank 43 are complementarily splined at 46 so that the splines 4500 of the slide element 45 are precisely aligned with the splines 4200 of the splined head element 42. The lock element 44 and the slide element 45 are each provided with annularly spaced complementary cams 440 and 450 respectively by means of which axial movement of the slide element 45 turns the lock element 44 in the direction indicated by the arrow on the lock element 44 to lock internally splined work on the chuck 40 in a like and similar manner to the locking of work W on the arbor 20 with the exception that the construction of the chuck 40 is such that the locking of work thereonto may be accomplished by power means.

To avoid undue friction between the adjacent annular faces of the splined head 42 and the lock element 44 when locking a work piece, not shown in Fig. 11, onto the chuck 40, a ball bearing 47 has been interposed between the adjacent ends of the head 42 and the lock element 44. A cam-lock actuator 48 which may be in the form of a headed rod is disposed in slidable relationship through central apertures in the body 41, in the mounting plate 54 and in the spindle or machine head 52. The underside of the head 480 of the cam-lock actuator 48 contacts the outer annular end of the slide element 45 to move the slide element 45 in the direction indicated by the arrow thereon when the cam-lock actuator 48 is moved in the same direction by mechanical, hydraulic or other means, not shown. To permit the head 480 of the cam-lock actuator 48 to contact the end of the slide element 45, the shank 43 of the body 41 is somewhat shorter than the combined length of the lock element 44 and the slide element 45.

Movement of the cam-lock actuator 48 in the direction indicated by the arrow thereon moves the slide element 45 in the same direction and causes the cams 450 of the slide element 45 to engage the cams 440 of the lock element 44 and turn the lock element 44 in the direction indicated by the arrow thereon.

When the cam-lock actuator 48 is in its released position attained by moving it outwardly or in a direction opposite to the arrow thereon, the splines 4400 of the lock element 44 are resiliently aligned and maintained in alignment with the splines 4200 of the head element 42 and the splines 4500 of the slide element 45 by means of a plurality of leaf springs 49 positioned in oppositely disposed circumferentially spaced slots 50 and 51 in the adjacent end faces of the head 42 of the body 41 and the lock element 44 respectively. The details of construction of the leaf springs 49 and the slots 50 and 51 are preferably similar to those of the leaf springs 29 and the slots 30 and 31 of the embodiment of the invention disclosed in Figs. 1-10 inclusive.

The operation of the spline chuck 40 disclosed in Fig. 11 is similar in every respect to the operation of the spline arbor 20 disclosed in Figs. 1-10 inclusive except that the chuck is locked and unlocked responsive to axial movement of the cam-lock actuator 48 of the chuck 40 rather than responsive to the turning of the cam-lock actuator 27 of the arbor 20.

In mounting the spline chuck 40 on a spindle or machine head 52, the inner end of the head 42 of the chuck 40 is preferably secured by suitable studs 53 into a central well 540 in the mounting plate 54, and the mounting plate 54 is then secured by suitable studs 55 centrally onto the spindle or machine head 52, all as indicated in Fig. 11.

Referring now to Figs. 12-16 inclusive, a chuck 60 is disclosed to indicate one manner in which spline arbors or chucks embodying the invention may be employed to center and lock externally splined work W therein.

The chuck 60 is composed of a sleeve type body 61 including a mounting flange 610, an internally splined inner collar 62 and a sleeve 63 internally formed to receive an internally splined lock element 64, and an internally splined slide element 65. The splines 6200, 6400 and 6500 of the inner collar 62, the lock element 64 and the slide element 65 are identical and complementary to the external splines of work W to be chucked therein. A suitable key 66 positioned in complementary keyways cut in the sleeve 63 and the slide element 65 mounts the slide element 65 within the sleeve 63 with the splines 6500 of the slide element 65 in precise alignment with the splines 6200 of the collar element 62. The lock element 64 and the slide element 65 are each provided with annularly spaced complementary cams 640 and 650 respectively by means of which axial movement of the slide element 65 turns the lock element 64 in one direction to center and lock externally splined work W in the arbor 60 and in the opposite direction to unlock the said work W after the desired operation has been performed thereon. A cam-lock actuator 67 is rotatably mounted on the slide element 65 between the annular shoulder 68 formed on the slide element 65 and an annular ring 69 secured on the outer end thereof by the studs 70. The cam lock actuator 67 is threaded at 71 into the outer end of the sleeve 63 so that turning of the cam-lock actuator 67 moves the slide element 65 axially within the sleeve 63. Suitable radially disposed circumferentially spaced gripping elements 72 may be mounted on the collar 670 of the cam-lock actuator 67 to form a hand wheel to facilitate the turning thereof clockwise as viewed from the end of the chuck 60 to lock work W therein by causing the cams 650 of the slide element 65 to engage the cams 640 of the lock element 64 to turn the lock element 640 clockwise as viewed from the outer end of the chuck 60. The cam-lock actuator 67 is turned counterclockwise to unlock the work W to permit it to be removed from the chuck 60.

Fig. 13 shows the locked relationship between the axially spaced splines 6200 and 6500 of the inner collar 62 of the sleeve 63 and the slide element 65 respectively and the splines of the work W, while Fig. 14 shows the locked relationship between the splines 6400 of the lock element 64 and the splines of the work W.

A retainer screw 73 disposed through the sleeve element 63 has its inner end 730 positioned in a circumferential groove 74 provided around the outer periphery of the locking element 64. Thus, the retainer screw 73 prevents unnecessary axial movement of the locking element 64 when the cam-lock actuator 67 is turned to its unlocked position.

The inner end of the sleeve type body 61 is provided with an annular groove 75 therein to accommodate a stop plate 76 which is employed to gage or position the work W axially in the chuck 60. The stop plate 76 is secured to the inner end of the chuck 60 by suitable studs 77. If mounted on a machine spindle 78, the mounting flange 610 of the chuck 60 is secured by studs 79 to an annularly flanged mounting disc 80 which is then threaded onto the threaded end of the spindle 78.

In Figs. 15 and 16, the cams 640 and 650 of the lock element 64 and slide element 65 are shown in their locked and unlocking position. In the embodiment of the invention disclosed in Figs. 12–16 inclusive, since the work W may be difficult to grip for removal from within the chuck 60, the cam elements 640 and 650 have been formed to turn the lock element 64 in one direction to center and lock the work W, and in the opposite direction to unlock the work W. This feature is of considerable importance when a chuck 60 has its internally splined elements helically splined to receive, center and lock complementarily helically splined work therein.

The operation of the chuck 60 is like and similar to the operation of the chucks 20 and 40 hereinbefore described, the single exception being that the work engaging elements of the chucks 20 and 40 are self-aligning upon being unlocked. Although not shown, it is obvious that if desired, the self-aligning feature of chucks 20 and 40 may be incorporated into the chuck 60.

Although but several embodiments of the invention have been disclosed and described herein, it is obvious that many changes may be made in the size, shape, detail and arrangement of the elements of the invention without departing from the spirit and scope thereof as defined by the appended claims.

I claim:

1. In a device of the class described, a body member including a head and a shank extending axially therefrom, a lock element rotatably mounted on said shank adjacent said head, a slide element slidably mounted on said shank adjacent said lock element, said head and said lock and slide elements being externally splined to receive complementarily internally splined work thereon, cams formed on adjacent annular faces of said lock and slide elements adapted to turn the lock element responsive to axial movement of said slide element to engage and center work telescoped on said head and said lock and slide elements, and a cam-lock actuator on said shank adapted to move said slide element and actuate said lock element.

2. In a device of the class described, a body member including a head and a shank extending axially therefrom, a lock element rotatably mounted on said shank adjacent said head, a slide element slidably mounted on said shank adjacent said lock element, said head and said lock and slide elements being externally splined to receive complementarily internally splined work thereon, cams formed on adjacent annular faces of said lock and slide elements adapted to turn the lock element responsive to axial movement of said slide element to engage and center work telescoped on said head and said lock and slide elements, resilient means normally aligning said lock element splines with the splines of said head and said slide element, and a cam-lock actuator threaded on said shank turnable to move said slide element and actuate said lock element.

3. In a device of the class described, a body member including a head and a shank extending axially therefrom, a lock element rotatably mounted on said shank adjacent said head, a slide element slidably mounted on said shank adjacent said lock element, said head and said lock and slide elements being externally splined to receive complementarily internally splined work thereon, cams formed on adjacent annular faces of said lock and slide elements adapted to turn the lock element responsive to axial movement of said slide element to engage and center the work on said head and said lock and slide elements, the adjacent annular ends of said head and said locking member having oppositely arranged axially and radially disposed slots therein, a leaf spring means in said slots resiliently urging the splines of said locking element in alignment with the splines of said head and said slide element, and a cam-lock actuator threaded on said shank turnable to move said slide element and actuate said lock element.

4. A chuck for internally splined work comprising a body member including a head and shank extending axially therefrom, said body member having an axially disposed aperture therethrough, a lock element rotatably mounted on said shank adjacent said head, a slide element slidably mounted on said shank adjacent said lock element, said head and said lock and slide elements having external splines formed thereon onto which said work is telescoped, cams formed in adjacent annular faces of said lock and slide elements adapted to turn the lock element responsive to axial movement of said slide element to engage and center the work on said head and said lock and slide elements, and a cam-lock actuating rod reciprocatingly mounted through said shank adapted to engage and move said slide element to actuate said lock element.

5. A chuck for internally splined work comprising a body member including a head and shank extending axially therefrom, said body member having an axially disposed aperture therethrough, a lock element rotatably mounted on said shank adjacent said head, a slide element slidably mounted on said shank adjacent said lock element, said head and said lock and slide elements having external splines formed thereon onto which said work is telescoped, cams formed in adjacent annular faces of said lock and slide elements adapted to turn the lock element responsive to axial movement of said slide element to engage and center the work on said head and said lock and slide elements, resilient means normally aligning said lock element splines with the splines of said head and said slide element, and a cam-lock actuating rod reciprocatingly mounted through said shank adapted to engage and move said slide element to actuate said lock element.

6. A chuck for internally splined work comprising a body member including a head and shank extending axially therefrom, said body member having an axially disposed aperture therethrough, a lock element rotatably mounted on said shank adjacent said head, a slide element slidably mounted on said shank adjacent said lock element, said head and said lock and slide elements having external splines formed thereon onto which said work is telescoped, cams formed in adjacent annular faces of said lock and slide elements adapted to turn the lock element responsive to axial movement of said slide element to engage and center the work on said head and said lock and slide elements, the adjacent annular ends of said head and said locking member having oppositely arranged axially and radially disposed slots therein, leaf spring means in said slots resiliently urging the splines of said locking element in alignment wtih the splines of said head and said slide element, and a cam-lock actuating rod reciprocatingly mounted through said shank adapted to engage and move said slide element to actuate said lock element.

7. In a chuck for externally splined work comprising a hollow body member, an annular lock element rotatably mounted in said hollow body member, an annular slide element slidably mounted in said body member having an annular face disposed adjacent an annular face of said lock element, said lock and slide elements having internal splines formed therein into which said work is telescoped, cams formed in the adjacent annular faces of said lock and slide elements adapted to turn the lock element responsive to axial movement of said slide element to engage and center the work telescoped in said body member, and an annular cam-lock element threaded into said body member engageable with said slide element to move said slide element axially and actuate said lock element.

8. In a chuck for externally splined work comprising a hollow body member, an annular lock element rotatably mounted in said hollow body member, an annular slide element slidably mounted in said body member having an annular face disposed adjacent an annular face of said lock element, said lock and slide elements having internal splines formed therein into which said work is telescoped, cams formed in the adjacent annular faces of said lock and slide elements adapted to turn the lock element responsive to axial movement of said slide element to engage and center the work telescoped in said body member, and an annular cam-lock element threaded into said body member engageable with said slide element to move said slide element axially and actuate said lock element, said cams on said lock and slide elements being arranged in interlocking relationship whereby the threading of said cam-lock element out of the body moves the slide element axially to release said lock element.

9. In a device of the class described, a body member, a lock element carried by and rotatably mounted in respect to said body member, a slide element carried by and slidably mounted in respect to said body member disposed adjacent said lock element, aligned splines formed on said lock element and said slide element, said lock and slide elements having adjacent annular faces, cam means formed on said adjacent annular faces of said lock element and said slide element adapted to turn the lock element responsive to axial movement of said slide element whereby to cause opposite faces of the splines of the lock element and the slide element to engage opposite faces of complementarily splined work telescoped onto said splined lock and slide elements, and means for moving the slide element axially to actuate said lock element.

10. In a device of the class described, a body member, a lock element carried by and rotatably mounted in respect to said body member, a slide element carried by and slidably mounted in respect to said body member disposed adjacent said lock element, aligned splines formed on said lock element and said slide element, said lock and slide elements having adjacent annular faces, cam means formed on the adjacent annular faces of said lock element and said slide element adapted to turn the lock element responsive to axial movement of said slide element whereby to cause opposite faces of the splines of the lock element and the slide element to engage opposite faces of complementarily splined work telescoped onto the splined lock and slide elements, resilient means constantly urging said lock element to turn to a position wherein the splines of the slide element and lock element are in alignment, and means for moving the slide element axially to actuate said lock element.

11. In a device of the class described, a body member, a lock element carried by and rotatably mounted in respect to said body member, a slide element slidably mounted in respect to said body member disposed adjacent said lock element, aligned splines formed on said lock element and said slide element, said lock and slide elements having adjacent annular faces, cam means formed on the adjacent annular faces of said lock element and said slide element adapted to turn the lock element responsive to axial movement of said slide element whereby to cause opposite faces of the splines of the lock element and the slide element to engage opposite faces of complementarily splined work telescoped onto the splined lock and slide elements, resilient means engaging said lock element and said body member constantly urging said lock element to turn to its unlocked position with the splines of said slide element and said lock element in alignment, and means for moving the slide element axially to actuate said lock element.

12. In a device of the class described, a body member, a lock element carried by and rotatably mounted in respect to said body member, a slide element carried by and slidably mounted in respect to said body member disposed adjacent said lock element, aligned splines formed on said lock element and said slide element, said lock and slide elements having adjacent annular faces, cam means formed on the adjacent annular faces of said lock element and said slide element adapted to turn the lock element responsive to axial movement of said slide element whereby to cause opposite faces of the splines of the lock element and the slide element to engage opposite faces of complementarily splined work telescoped onto the splined lock and slide elements, said cam means being formed for disposal in interlocked relationship whereby axial movement of the slide element in opposite directions locks and unlocks work disposed on said slide and lock elements, and means for moving said slide element axially in either of said opposite directions to lock and unlock work positioned on said slide and lock elements.

References Cited in the file of this patent
UNITED STATES PATENTS

| 2,445,184 | Parker et al. | July 13, 1948 |
| 2,580,949 | Parker et al. | Jan. 1, 1952 |
| 2,681,805 | Parker et al. | June 22, 1954 |